(12) United States Patent
Walker

(10) Patent No.: US 7,970,091 B2
(45) Date of Patent: Jun. 28, 2011

(54) METHOD FOR REDUCING SPECTRAL REGROWTH IN A SPECTRALLY EFFICIENT DIGITAL MODULATION SCHEME

(75) Inventor: Brian W. Walker, Halifax (CA)

(73) Assignee: Nautel Limited, Hackett's Cove, Nova Scotia (CA)

( * ) Notice: Subject to any disclaimer, the term of this patent is extended or adjusted under 35 U.S.C. 154(b) by 789 days.

(21) Appl. No.: 11/948,273

(22) Filed: Nov. 30, 2007

(65) Prior Publication Data

US 2009/0141817 A1    Jun. 4, 2009

(51) Int. Cl.
*H04K 1/10* (2006.01)
*H04L 27/28* (2006.01)

(52) U.S. Cl. ...................................................... 375/360
(58) Field of Classification Search .................. 375/360
See application file for complete search history.

(56) References Cited

U.S. PATENT DOCUMENTS

| | | | |
|---|---|---|---|
| 2002/0090921 A1* | 7/2002 | Midtgaard et al. | 455/126 |
| 2005/0046474 A1* | 3/2005 | Matsumoto et al. | 330/10 |
| 2006/0092326 A1* | 5/2006 | Tanabe | 348/571 |
| 2007/0216554 A1* | 9/2007 | Ahmed | 341/118 |
| 2009/0088093 A1* | 4/2009 | Nentwig | 455/114.3 |

* cited by examiner

*Primary Examiner* — David C. Payne
*Assistant Examiner* — Tanmay K Shah
(74) *Attorney, Agent, or Firm* — Jenkins, Wilson, Taylor & Hunt, P.A.

(57) ABSTRACT

A method that uses time-domain processing on a spectrally efficient digital modulation scheme to reduce the bandwidth expansion in envelope elimination and restoration (EER) amplifiers is disclosed. The method identifies and localizes sections of the signal responsible for the out of band emissions, or spectral regrowth, using a filter. The detected sections are flagged and extended to allow for introduction of a lower frequency transition in place of the extended section, thus reducing spectral regrowth from the output of an EER amplifier. The method is particularly useful for improving the quality of digital AM radio transmission.

33 Claims, 4 Drawing Sheets

METHOD FOR REDUCING SPECTRAL REGROWTH IN A SPECTRALLY EFFICIENT DIGITAL MODULATION SCHEME

CROSS-REFERENCE TO RELATED APPLICATIONS

This is the first application filed for the present invention.

TECHNICAL FIELD

Generally, the present application relates to a method for reducing spectral regrowth in a spectrally efficient digital modulation scheme. More specifically, the present invention relates to a method for identifying sections of a digital signal that may contribute to spectral regrowth from an envelope elimination and restoration amplifier and an algorithm for replacing such sections.

BACKGROUND OF THE INVENTION

As the radio spectrum becomes more crowded, spectrally efficient digital modulation schemes such as orthogonal frequency division multiplexing (OFDM) are replacing existing analog transmission schemes. This is equally true for the terrestrial amplitude modulation (AM) radio broadcast band, which until recently has resisted any move towards digital broadcast due to the huge costs involved.

For the AM radio broadcast band, there are several standards being considered for digital audio broadcast (DAB), all using OFDM. One of the main challenges to implementing digital audio broadcasting is that existing broadcast equipment was not designed for such a scheme. Unlike analog AM, which is a low bandwidth amplitude modulated signal, OFDM is a noise-like signal with significant amplitude and phase modulation.

Most AM transmitters use envelope elimination and restoration (EER) amplifier architecture, where the amplitude and phase components of the signal are amplified separately then recombined at the high power stage. The magnitude and phase component bandwidths are several times that of the input signal, and any filtering in the amplifier will result in spectral regrowth due to poor cancellation of this high frequency content.

In particular, in an EER amplifier, both the magnitude and phase-modulated carrier experience filtering. On the magnitude path, there will be a reconstruction filter to eliminate switching noise and harmonics from the power electronics. The phase modulated carrier has to pass through a network drive, which may be tuned to the carrier frequency. When the signals are recombined, the transitions in the two signals may not perfectly cancel, resulting in spectral regrowth.

Accordingly, there is a need to develop a method of signal correction processing that can be applied to a digital audio broadcast signal intended for transmission through an EER transmitter to reduce spectral regrowth.

SUMMARY OF THE INVENTION

It is an object of the present invention to provide a method that uses time-domain processing on a spectrally efficient digital modulation scheme to reduce the bandwidth expansion in EER amplifiers.

It is a further object of the present invention to provide an algorithm to identify distortion-causing signal sections and which replaces each one with an alternative signal trajectory.

According to an aspect of the present invention, there is provided a method for reducing spectral regrowth in a spectrally efficient digital modulation scheme, the method comprising the steps of: converting a first digital signal into first and second carrier paths; filtering the first and second carrier paths; comparing the filtered first and second carrier paths against a threshold; identifying sections of the carrier paths that exceed the threshold; recombining the carrier paths into a second digital signal; extending the sections of the second digital signal that correspond to the sections of the carrier paths that exceed the threshold to generate areas for correction; and replacing the areas of the second digital signal requiring correction with an alternative signal trajectory.

According to another aspect of the present invention, there is provided a method for reducing spectral regrowth in a spectrally efficient digital modulation scheme, the method comprising the steps of: converting a first digital signal into magnitude and phase-modulated carrier paths; filtering the magnitude and phase-modulated carrier paths; comparing the filtered magnitude and phase-modulated carrier paths against a threshold; identifying sections of the carrier paths that exceed the threshold; recombining the carrier paths into a second digital signal; extending the sections of the second digital signal that correspond to the sections of the carrier paths that exceed the threshold to generate areas for correction; and replacing the areas of the second digital signal requiring correction with an alternative signal trajectory.

In one embodiment, the method is applied to the amplitude and phase components of an OFDM signal before it passes through an EER amplifier.

BRIEF DESCRIPTION OF THE DRAWINGS

These and other features, aspects and advantages of the present invention will become better understood with regard to the following description and accompanying drawings wherein.

It will be noted that throughout the appended drawings, like features are identified by like reference numerals.

DETAILED DESCRIPTION OF THE PREFERRED EMBODIMENT

The following description is of one particular embodiment by way of example only and without limitation to the combination of features necessary for carrying the invention into effect.

As a representative example, description of the method is given using a digital audio broadcast signal intended for transmission through an EER amplifier. However, persons of ordinary skill in the art will readily understand that the general method can be applied to reduce spectral regrowth in most spectrally efficient digital modulation schemes.

In an EER amplifier, the spectral regrowth can be reduced if the relevant locations in the signal causing the spectral regrowth are identified and altered. The method of the present invention uses a signal processing algorithm on the OFDM signal, before the signal is converted to the analog domain and passed through the EER amplifier. Using this arrangement, no feedback path is necessary and the parameters of the algorithm are chosen based on knowledge about the signals in use and the amplifier design.

Generally, the method involves: identifying and localizing the sections of the signal responsible for the out of band emissions using a filter; flagging the detected sections and extending them; and introducing a lower frequency transition in the place of each section. As a final step, the corrected signal is filtered to ensure that it remains within the original signal bandwidth.

Figure 1:
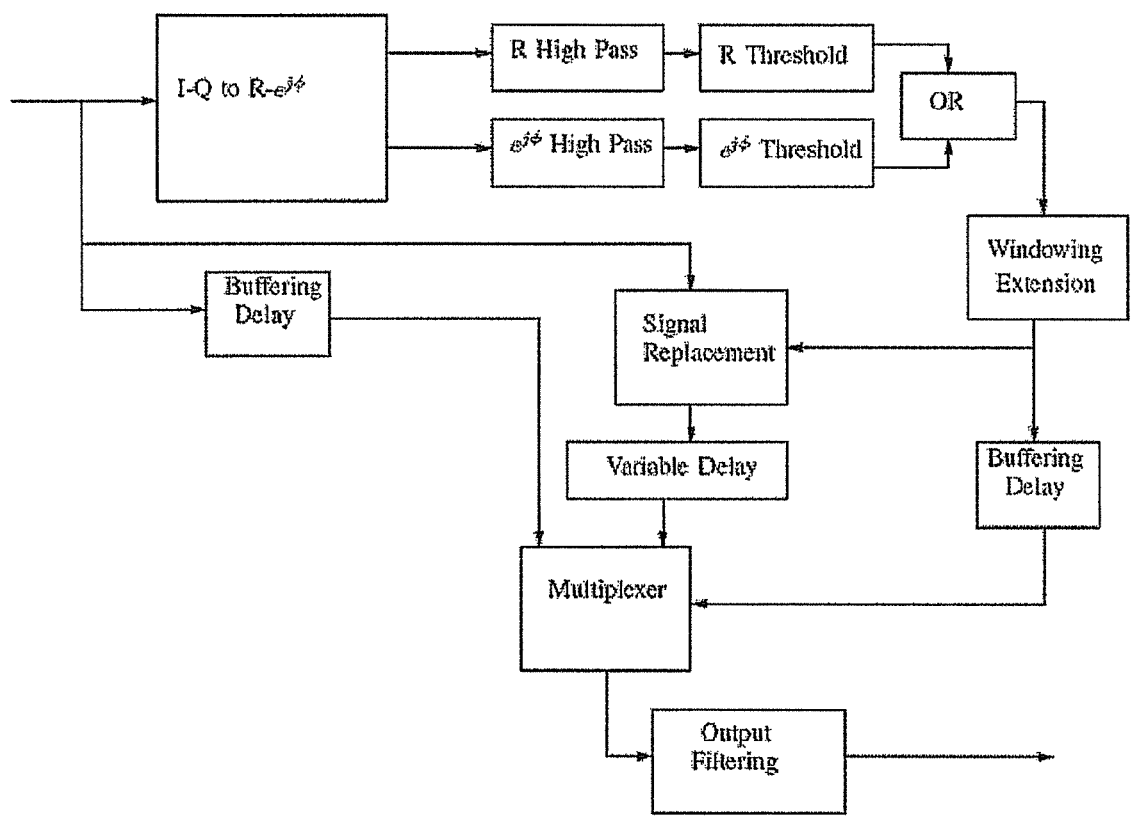
FIG. 1 is a flow-chart of the algorithm operation.

The algorithm is intended to be a streaming algorithm, which could be performed in real time on a signal. A block diagram of a possible implementation of the algorithm is shown in FIG. 1. One way that the algorithm could be made to run in real-time, would be to batch process the signal thus parallelizing the algorithm. In this case, the sampling rate would have to be high enough to contain the majority of the bandwidth expansion on the magnitude and phase-modulated carrier paths. For example, for a standard OFDM signal, an oversampling ratio of at least 10 should allow the bandwidth expansion to be contained within the sampled signal bandwidth.

The type of input signal that will result in out of band distortion is correlated to the type of amplifier being used. Accordingly, the processing should be configured to eliminate these types of signal. In the present example, the main amplifier characteristics of interest are the available bandwidth on the magnitude and phase-modulated carrier paths. However, other amplifier characteristics may be important depending on the signal and amplifier in the system. The amplifier characteristics will influence the design of the detection filters, the thresholds used and the windowing extensions.

The sections of the signal that will cause distortion and need to be replaced are those that will not pass through the magnitude and phase paths unaltered. Since the frequency response on the magnitude path is usually low pass, the relevant sections of the envelope signal can be detected using a high pass filter. As a general rule, any frequency that will not be passed by the magnitude path of the amplifier (normally greater than 6 dB attenuation) or experiences a phase shift of greater than 45°, should be detected and eliminated. The detection filter bandwidth should be configured to take this guideline into consideration.

The detection filter should be close to the linear phase for the frequencies targeted for removal, so they can later be accurately localized in time. Such a detection filter could be provided as a high-pass finite impulse response (FIR) filter or a infinite impulse response (IIR) filter could also be designed to account for this characteristic. For a digital audio broadcast signal, the filter should have a very high attenuation in the low frequency stop band (typically 80 dB or more) in order to eliminate the impact of the larger magnitude low-frequency components on the detection process.

The phase-modulated carrier path tends to be more wide band than the magnitude path in an EER amplifier. However, the phase-modulated carrier signal has a fairly wide bandwidth. As such, it may be beneficial to detect and reduce extremely high frequency phase transitions. Since the phase signal tends to have spectral content that goes up in frequency indefinitely, it is preferable to trigger a correction on a high frequency transition in this signal, rather than on the magnitude signal.

In most cases, the high frequency phase transitions of the signal detected by the phase filter will tend to be at the same location as those detected by the magnitude filter, since it is in these locations that they must cancel properly to avoid distortion. Even if the phase path is wide band, it can be used as a secondary indicator to detect the sections of the magnitude signal that will cause distortion at the output. The identification process is more likely to cancel the distortion if it triggers corrections on the transitions in both signals.

An important consideration for the identification process are the thresholds against which to compare the filtered signals to trigger a signal correction. If a threshold is chosen that is too high, almost no correction will take place, even if the correct filter bandwidth is chosen, since the high frequency content will rarely exceed the threshold and trigger a correction. Conversely, if the threshold is too low, the algorithm will trigger on almost all sections of the signal, since there are low levels of high frequency content at many points in the signal. Generally, these thresholds should be set to a low percentage of the RMS level of the signal, but the exact value will depend on the signal being used.

The stringency of the spectral mask that the amplifier output needs to meet will correlate to the amount of high frequency content, and correspondingly distortion, that is acceptable. The thresholds should be initially set to a significant percentage of the RMS level, such as 20% of the signal RMS level, then gradually decreased until the distortion is at an acceptable level. As the threshold is decreased, the processing will trigger on more of the signal. At the same time, the bit error rate and error vector magnitude should be monitored to ensure that the overall performance of the digital communication system will be adequate.

The general stages for identifying the section of the signal to be corrected are conversion of the signal to polar representation, magnitude and phase filtering, comparing the filtered signals against thresholds, and extending the sections that exceed the thresholds to determine the final areas of the signal to be corrected.

The filters may not be the same for the magnitude and phase-modulated carrier paths. Phase shifts are usually more of a problem for the phase-modulated carrier path than magnitude reduction, since the phase of this signal is all that is significant in an EER amplifier. Examining the phase modulated carrier signal can also indicate where there will be out of band emissions due to the magnitude path. If there is a rapid phase transition, the magnitude signal will need to track it very accurately to prevent distortion.

Once the appropriate filters have been chosen for the magnitude and phase, the signals must be filtered. Since the processing algorithm is designed to be used as a streaming algorithm, the filtering should be done on a sample by sample basis. Through the use of buffering, the correct filtered samples can then be matched up with their corresponding inputs so that correction can take place.

After filtering has been performed on the magnitude and phase-modulated carrier signals, the high frequency content for each of the signals needs to be compared to a threshold to see where corrections are necessary. This operation is performed on the high-pass filtered magnitude signal, and on the absolute value of the high-pass filtered phase-modulated carrier signal. The outputs from the thresholds need to pass through a logical OR operation: if either threshold has been exceeded, the output needs to be set to true. In a subsequent stage, morphological operators are used to extend and smooth the output from this stage.

Figure 2:
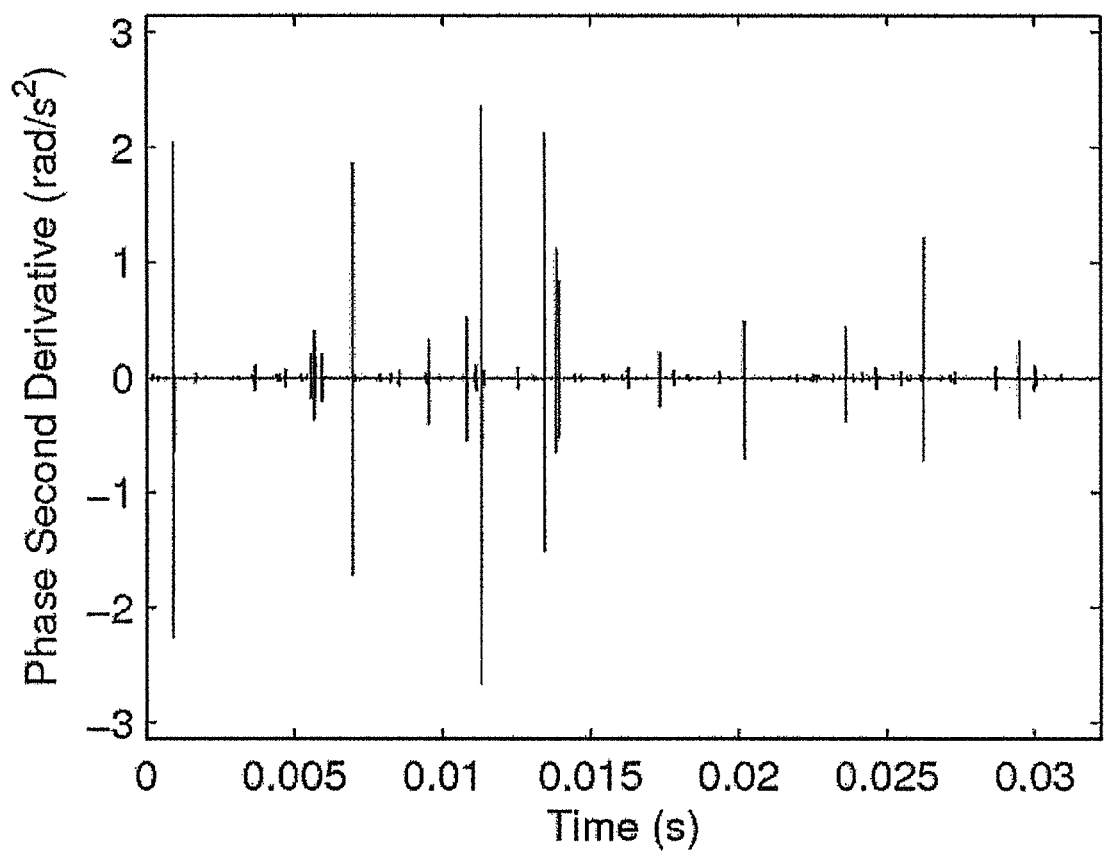
FIG. 2 is a graph of the second derivative of the phase for an HD Radio™ All-Digital AM signal.

Although the preferred method of detection involves filtering and thresholding the magnitude and phase signals, alternate methods are also contemplated. Generating the magnitude and phase signals from the complex input can be rather computationally intensive, so other criteria may be needed. One suitable choice is to calculate the second derivative of the phase, and compare it to a threshold instead of the high pass filtered signals. Avoiding the high pass filter and the magnitude operation can lead to significant savings in the time required to run the detection. An example of the second derivative of the phase is shown in FIG. 2. When compared to the high-pass filtered phase carrier, there is significant content in both signals at the same locations.

Another way the detection could be performed is to examine the magnitude of the signal, and trigger it if the signal trajectory passed close to the origin. Although the algorithm would likely trigger a correction at any time it was needed, it would also trigger a large number of unnecessary corrections, since the signal does sometimes pass near the origin with no high frequency phase transition. With an HD Radio™ Hybrid AM signal, the transitions only tend to occur when the analog and digital modulation peaks line up, although the signal does approach the origin relatively frequently.

Any points which exceed the thresholds need to be extended out to either side by several samples, making it possible to avoid the original high frequency transition. Alternatively, several small corrections that are close in time can be joined into one larger, more effective correction. A general length for this extension would be a fraction of a cycle of the highest frequency allowed to pass through the system.

Mathematical morphology operators can be used for this type of nonlinear signal filtering. For example, the Boolean dilation and erosion operators are useful for this operation. For the correction to take place, the region that needs to be replaced is extended by a few samples in either direction. This can be accomplished by performing a dilation on the output from the threshold comparison stage. Generally, this will lengthen the undesirable sections of the signal to allow for correction. The length of this window can vary and is chosen in order to determine the effectiveness of this stage. If the length of the window is too long, the output signal will be unduly distorted. If it is set to be too short, the correction will be ineffective since the signal trajectory will be too well defined.

In the event that two corrections occur extremely close to each other in time, they can be joined and one larger correction performed. The net error of the signal may be increased slightly, but the correction will be more effective. The minimum proximity allowed between two corrections without joining them is another parameter that must be set. In one example, this value is the same as the window extension length. This operation can be performed by dilating the signal again, then performing an erosion. The net effect will be to join together any true sections that are closer together than the minimum distance.

At this point, the identification process is complete and the signal can proceed to the correction stage.

The output from the identification stage will be a Boolean vector, with the samples flagged where a signal correction needs to occur. Generally, during the correction stage the vector is scanned for a transition which indicates the beginning of a section to be replaced, and for the next transition to indicate the end of that section. Once such a section has been located, a generated segment with less high frequency content in the magnitude and phase terms is inserted in place of the original section.

The segment generated by the algorithm is typically maximally smooth in both Cartesian and polar coordinates. Accordingly, two separate cubic functions are calculated for each signal section being replaced. The derivatives at each end are held constant to those of the original signal at those points. By preserving the derivatives at these points, the interpolation becomes relatively smooth in both polar and Cartesian domains. The two cubic polynomials needed for the piecewise function are determined by first assigning an index to all samples in this region, beginning with 0 for the sample at the beginning of the region. A midpoint is generated taking the signal through a lower frequency path than the original. In the event that N+1 samples total in the section being replaced, the following equation can be used.

$$x\left(\frac{N}{2}\right) = \frac{|x(0)| + |x(N)|}{2} \cdot e^{0.5 \cdot j \cdot (\angle(x(0)) \cdot x(N)))} \quad (1)$$

The derivative at the point x(N/2) is not fixed by the end points, derivatives or the new fabricated midpoint, and instead must be generated. Normally, a natural spline interpolation, this is chosen so as to zero the second derivative. However, additional reduction can be made in the spectral regrowth by constructing a derivate based on the desired signal trajectory. The equation used to construct this point is based on the points and derivatives already in use and is given by:

$$\frac{dx\left(\frac{N}{2}\right)}{dt} = 0.8 \cdot \frac{x(N) - x(0)}{N} + 0.1 \cdot \frac{dx(0)}{dt} + 0.1 \cdot \frac{dx(N)}{dt} \quad (2)$$

The resulting interpolation to replace the flagged segment is not perfectly smooth in either polar or Cartesian representation, but it allows for a significant reduction in bandwidth expansion, with a smoother magnitude change and more uniform phase rotation. The signal can be passed through a low pass filter as the final stage to limit this distortion.

The output filtering stage is used to ensure that the output of the interpolation stage is within the bandwidth of the original signal. Accordingly, the signal is decimated to a lower sampling rate, so that the desired content is between one quarter and one half of the Nyquist bandwidth, allowing for a much shorter filter. The signal can then be interpolated back to the desired output sampling rate.

Example

This section describes in detail the application of the algorithm to a DRM 10 kHz Digital signal in simulation. The simulations were performed over 8000 OFDM symbols, representing 231 seconds of real data. For the bit error rate plots, a shorter data set of 100 OFDM symbols were used for each point, representing 2.67 seconds of data.

Algorithm Configuration

The magnitude path in the simulation resembles one designed for analog AM. The filter used on the magnitude path was a standard 4-pole Butterworth filter, with a −3 dB cutoff frequency of 38 kHz.

The simulation model had a mild frequency response on the phase-modulated carrier path, similar to a low-Q bandpass response in an actual amplifier. The filter used for this distortion was a 6-pole Butterworth filter with a −3 dB cutoff frequency of 100 kHz, which is similar in bandwidth to a transmitter designed to transmit analog audio.

The simulations were run at 768 ksps. For the simulation model, the magnitude path has a −3 dB bandwidth of 38 kHz. The maximum allowed frequency was set to 40 kHz, which corresponds to −4 dB. The high pass magnitude filter was a 129-tap brick wall FIR filter.

For the phase path, the −3 dB corner frequency of the filter is 100 kHz. However, since the magnitude bandwidth is dramatically less than the phase bandwidth, the maximum allowed frequency on the phase path was reduced so that the two paths will trigger with the same signals. Accordingly, the phase path was triggered on signals above 60 kHz, using a 129-tap brick wall FIR filter.

Choosing Algorithm Paramaters

The DRM 10 kHz Digital signal is a standard OFDM signal, with no analog carrier. It relies on pilot carriers for phase and frequency synchronization. For all measurements on the DRM 10 kHz digital signal, the carrier that the signal is referenced to is the equivalent carrier power of the entire signal. The algorithm was set up to produce short, frequent correction. The experimental parameters are shown in Table I. The pilot carriers help with reception, allowing a high level of correction while maintaining an accurate bit error rate.

TABLE 1

DRM 10 KhZ DIGITAL PARAMETERS FOR THE PROCESSING ALGORITHM

| DRM 10 kHz Digital Parameters | Value |
| --- | --- |
| Sampling Rate | 768 kHz |
| Magnitude Filter Bandwidth | 40 kHz |
| Complex Phase Filter Bandwidth | 60 kHz |
| Magnitude Threshold | 0.5% RMS |
| Complex Phase Threshold | 5% RMS |
| Window Extension Length | 12 samples (15.6 μs) |
| Signal Bandwidth | 10 kHz total (−5 kHz to +5 kHz) |
| Triggering Frequency | 1.44 corrections per 1000 samples (1.11 corrections per ms) |
| Mean Correction Length | 41.3 samples (53.7 μs) |
| Decimation Ratio For Output Filter | 23 |
| Output Filter Sampling Rate | 33.3913 kHz |
| Output Filter Cutoff | 31.9% of Nyquist |

Simulation Results

The processed signal experienced a significant reduction in the bandwidth of both the magnitude and phase-modulated carrier terms. For the phase, there was an approximate 10 dB reduction in the spectral content by the phase path −3 dB cutoff frequency of 100 kHz. Similar reductions were observed in the magnitude path, although there was a much smaller reduction by the cutoff of the filter at 38 kHz, on the order of 3 dB.

Figure 3:
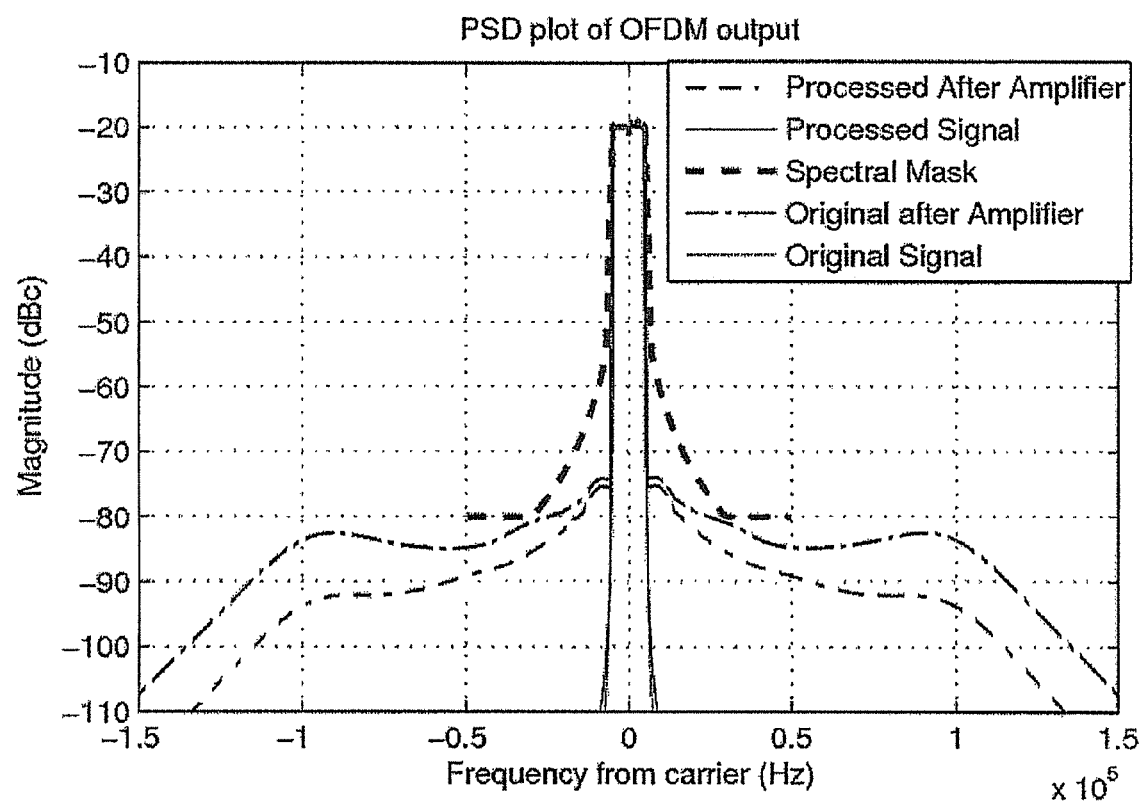
FIG. 3 is a graph showing the DRM 10 kHz digital spectrum from the example simulation.

The unmodified signal and the corrected signal were both passed through the simulation system. The results are shown in FIG. 3. The reductions close to the carrier are on the order of 3 to 5 dB, primarily due to the reduction in spectral content on the magnitude term. Further away from the carrier, around 100 kHz, the reductions increase to nearly 12 dB from the reduction in spectral content on the phase-modulated carrier. At the cutoff frequency of the filter, there is a significant phase shift on the phase path, resulting in these out of band emissions. The original and processed signals are also shown before passing through the simulation, but there is little difference between the two.

An average bit error rate of 3.24E-4 was introduced with these parameters for the corrected signal, well within the coding capabilities of the system.

Figure 4:
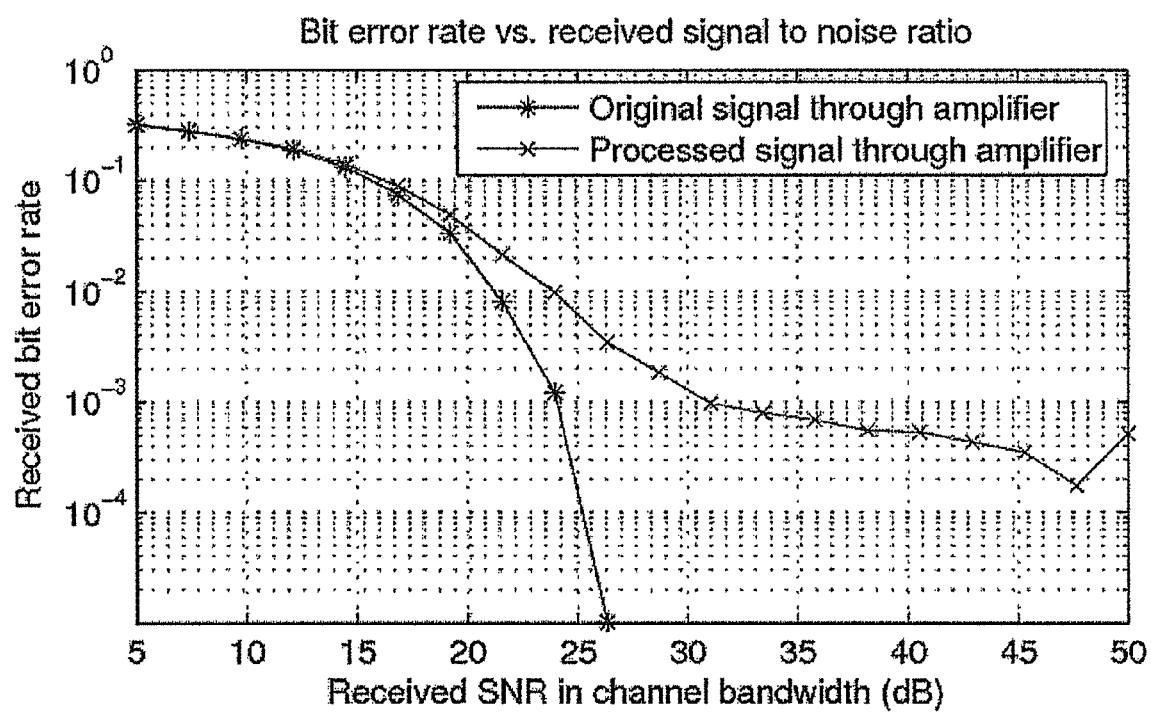
FIG. 4 is a graph showing the DRM 10 kHz digital bit error rates at various signal to noise ratios at the receiver for both the original and processed signals of the example.

The original and processed signals were simulated with various signal to noise ratios to determine their performance under various receiver conditions, as shown in FIG. 4. The processing had a slight effect on the bit error rate only at higher signal to noise ratios. The bit error rates achieved are within the coding capabilities on the DRM system, so the net effect of applying the processing for the listener should be minimal.

The application of the time-based processing showed a significant improvement in the spectrum, with minimal impact on the transmitted signal. For the simulated system, the processing increases the minimum spectral margin to 5 dB.

It will be understood that numerous modifications thereto will appear to those skilled in the art. Accordingly, the above description and accompanying drawings should be taken as illustrative of the invention and not in a limiting sense. It will further be understood that it is intended to cover any variations, uses, or adaptations of the invention following, in general, the principles of the invention and including such departures from the present disclosure as come within known or customary practice within the art to which the invention pertains and as may be applied to the essential features herein before set forth, and as follows in the scope of the appended claims.

I claim:

1. A method for reducing spectral regrowth in a spectrally efficient digital modulation scheme, the method comprising the steps of:
    converting a first digital signal into first and second carrier paths;
    filtering the first and second carrier paths;
    comparing the filtered first and second carrier paths against a threshold;
    identifying sections of the carrier paths that exceed the threshold;
    recombining the carrier paths into a second digital signal;
    extending the sections of the second digital signal that correspond to the sections of the carrier paths that exceed the threshold to generate areas for correction, wherein the step of extending the sections of the second digital signal is performed by a Boolean dilation on the second digital signal; and
    replacing the areas of the second digital signal requiring correction with an alternative signal trajectory.

2. The method according to claim 1, further comprising a step of filtering the corrected second digital signal to be within the bandwidth of the first digital signal.

3. The method according to claim 1, wherein the alternative signal trajectory is defined by $$x\left(\frac{N}{2}\right) = \frac{|x(0)| + |x(N)|}{2} \cdot e^{0.5 \cdot j \cdot (L(x(0) \cdot x(N)))} \quad (1)$$

wherein the derivative at x(N/2) is defined by $$\frac{dx\left(\frac{N}{2}\right)}{dt} = 0.8 \cdot \frac{x(N) - x(0)}{N} + 0.1 \cdot \frac{dx(0)}{dt} + 0.1 \cdot \frac{dx(N)}{dt}. \quad (2)$$

4. The method according to claim 1, wherein the step of identifying areas of the carrier paths that exceed the threshold is performed by a logical OR operation on the filtered first carrier path and the absolute value of the filtered second carrier path.

5. The method according to claim 1, wherein the step of identifying areas of the carrier paths that exceed the threshold is performed by calculating a second derivative of the second carrier path and comparing the second derivative value to the threshold.

6. The method according to claim 1, wherein the step of identifying areas of the carrier paths that exceed the threshold is performed by examining the first carrier path for signal trajectories that pass close to the origin.

7. The method according to claim 1, wherein two sections requiring correction having proximity equal to or less than the window extension length are joined together.

8. The method according to claim 7, wherein the two sections are joined together by further dilating the second digital signal and performing a Boolean erosion on the signal.

9. The method according to claim 1, wherein the step of the areas of the second digital signal requiring correction with an alternative signal trajectory involves scanning the output from the extending step for a transition to indicate the beginning of a section to be replaced and for the next transition to indicate the end of the section.

10. The method according to claim 9, wherein the section is replaced with a generated segment with less high frequency content in the magnitude and phase carrier paths.

11. The method according to claim 10, wherein the generated segment is produced by performing a cubic spline interpolation in the I-Q domain.

12. The method according to claim 11, wherein the generated segment is subjected to a second cubic spline interpolation in the I-Q domain and the derivatives at each end are held constant to those of the original signal at those points.

13. The method according to claim 12, wherein all samples within the generated segment are assigned an index with the sample at the beginning of the segment being assigned zero and a midpoint is fabricated to take the second digital signal through a lower frequency path.

14. The method according to claim 13, wherein the generated segment is defined by the formula $$x\left(\frac{N}{2}\right) = \frac{|x(0)| + |x(N)|}{2} \cdot e^{0.5 \cdot j \cdot (\angle(x(0) \cdot x(N)))} \quad (1)$$

wherein the derivative at x(N/2) is defined by formula $$\frac{dx\left(\frac{N}{2}\right)}{dt} = 0.8 \cdot \frac{x(N) - x(0)}{N} + 0.1 \cdot \frac{dx(0)}{dt} + 0.1 \cdot \frac{dx(N)}{dt}. \quad (2)$$

15. A method for reducing spectral regrowth in a spectrally efficient digital modulation scheme, the method comprising the steps of:
converting a first digital signal into magnitude and phase-modulated carrier paths;
filtering the magnitude and phase-modulated carrier paths;
comparing the filtered magnitude and phase-modulated carrier paths against a threshold;
identifying sections of the carrier paths that exceed the threshold;
recombining the carrier paths into a second digital signal;
extending the sections of the second digital signal that correspond to the sections of the carrier paths that exceed the threshold to generate areas for correction, wherein the step of extending the sections of the second digital signal is performed by a Boolean dilation on the second digital signal; and
replacing the areas of the second digital signal requiring correction with an alternative signal trajectory.

16. The method according to claim 15, further comprising a step of filtering the corrected second digital signal to be within the bandwidth of the first digital signal.

17. The method according to claim 1, wherein the spectrally efficient digital modulation scheme is orthogonal frequency-division multiplexing.

18. The method according to claim 15, further comprising outputting the filtered second digital signal to an envelope elimination and restoration amplifier.

19. The method according to claim 15, wherein the alternative signal trajectory is defined by $$x\left(\frac{N}{2}\right) = \frac{|x(0)| + |x(N)|}{2} \cdot e^{0.5 \cdot j \cdot (\angle(x(0) \cdot x(N)))} \quad (1)$$

wherein the derivative at x(N/2) is defined by $$\frac{dx\left(\frac{N}{2}\right)}{dt} = 0.8 \cdot \frac{x(N) - x(0)}{N} + 0.1 \cdot \frac{dx(0)}{dt} + 0.1 \cdot \frac{dx(N)}{dt}. \quad (2)$$

20. The method according to claim 15, wherein the magnitude and phase-modulated carrier paths are filtered by high-pass filters.

21. The method according to claim 20, wherein the high-pass filter is a high pass finite impulse response filter or an infinite impulse response filter.

22. The method according to claim 15, wherein the magnitude carrier path is filtered for frequency having greater than 6 dB attenuation or a phase shift of 45 degrees or greater.

23. The method according to claim 15, wherein the step of identifying areas of the carrier paths that exceed the threshold is performed by a logical OR operation on the high-pass filtered magnitude carrier and the absolute value of the high-pass filtered phase-modulated carrier path.

24. The method according to claim 15, wherein the step of identifying areas of the carrier paths that exceed the threshold is performed by calculating a second derivative of the phase-modulated carrier path and comparing the second derivative value to the threshold.

25. The method according to claim 15, wherein the step of identifying areas of the carrier paths that exceed the threshold is performed by examining the magnitude carrier path for signal trajectories that pass close to the origin.

26. The method according to claim 15, wherein two sections requiring correction having proximity equal to or less than the window extension length are joined together.

27. The method according to claim 26, wherein the two sections are joined together by further dilating the second digital signal and performing a Boolean erosion on the signal.

28. The method according to claim 15, wherein the step of the areas of the second digital signal requiring correction with an alternative signal trajectory involves scanning the output from the extending step for a transition to indicate the beginning of a section to be replaced and for the next transition to indicate the end of the section.

29. The method according to claim 28, wherein the section is replaced with a generated segment with less high frequency content in the magnitude and phase carrier paths.

30. The method according to claim 29, wherein the generated segment is produced by performing a cubic spline interpolation in the I-Q domain.

31. The method according to claim 30, wherein the generated segment is subjected to a second cubic spline interpolation in the I-Q domain and the derivatives at each end are held constant to those of the original signal at those points.

32. The method according to claim 31, wherein all samples within the generated segment are assigned an index with the sample at the beginning of the segment being assigned zero and a midpoint is fabricated to take the second digital signal through a lower frequency path.

33. The method according to claim 32, wherein the generated segment is defined by $$x\left(\frac{N}{2}\right) = \frac{|x(0)| + |x(N)|}{2} \cdot e^{0.5 \cdot j \cdot (\angle(x(0) \cdot x(N)))} \quad (1)$$

wherein the derivative at x(N/2) is defined by $$\frac{dx\left(\frac{N}{2}\right)}{dt} = 0.8 \cdot \frac{x(N) - x(0)}{N} + 0.1 \cdot \frac{dx(0)}{dt} + 0.1 \cdot \frac{dx(N)}{dt}. \quad (2)$$

* * * * *